(12) United States Patent
Takehiko et al.

(10) Patent No.: US 7,354,634 B2
(45) Date of Patent: Apr. 8, 2008

(54) COMPOSITION FOR FORMING RECEIVING LAYER AND RECORDING SHEET FOR INKJET PRINTING

(75) Inventors: Nishikawa Takehiko, Saitama (JP); Hirota Koichi, Saitama (JP)

(73) Assignee: Lintec Corporation, Tokyo (JP)

( * ) Notice: Subject to any disclaimer, the term of this patent is extended or adjusted under 35 U.S.C. 154(b) by 417 days.

(21) Appl. No.: 10/975,467

(22) Filed: Oct. 29, 2004

(65) Prior Publication Data

US 2005/0148691 A1   Jul. 7, 2005

Related U.S. Application Data

(63) Continuation-in-part of application No. 10/108,468, filed on Mar. 29, 2002, now abandoned.

(30) Foreign Application Priority Data

Mar. 30, 2001 (JP) .............................. 2001-100571

(51) Int. Cl.
*B41M 5/40* (2006.01)

(52) U.S. Cl. ................ 428/32.31; 428/32.1; 428/32.32; 428/32.34; 428/32.37; 524/492; 524/493; 524/556

(58) Field of Classification Search ............. 428/31.31, 428/31.32, 31.37, 32.1, 32.4, 32.31, 32.32, 428/32.37; 524/492, 493, 556
See application file for complete search history.

(56) References Cited

U.S. PATENT DOCUMENTS

| | | | |
|---|---|---|---|
| 4,148,864 A | 4/1979 | Groth et al. | |
| 4,157,387 A | 6/1979 | Benedict | |
| 4,474,850 A | 10/1984 | Burwasser | |
| 5,264,200 A | 11/1993 | Felthouse et al. | |
| 5,766,398 A | 6/1998 | Cahill et al. | |
| 5,856,001 A * | 1/1999 | Okumura et al. | ........ 428/32.36 |
| 6,132,039 A | 10/2000 | Nishimura | |
| 6,332,679 B1 | 12/2001 | Higuma et al. | |
| 6,383,611 B1 * | 5/2002 | Kohno et al. | ............ 428/32.34 |
| 6,406,775 B1 | 6/2002 | Houde | |
| 6,426,034 B1 | 7/2002 | McComas et al. | |
| 2002/0037395 A1 | 3/2002 | Zhong et al. | |

OTHER PUBLICATIONS

Lewis, Peter A., Pigment Handbook vol. 1, $2^{nd}$ Edition, John Wiley & Sons, New York, 1988, pp. 176, 179-180.

* cited by examiner

*Primary Examiner*—Bernard Lipman
(74) *Attorney, Agent, or Firm*—Oblon, Spivak, McClelland, Maier & Neustadt, P.C.

(57) ABSTRACT

A composition for forming a receiving layer for inkjet printing is provided. The composition, which is a solution or dispersion of a binder resin and a water-containing synthetic silica obtained by a wet gelling method in a solvent containing 10-80% by weight of alcohol, has a low viscosity, exhibits excellent applicability, can adsorb a large amount of ink, and can form a hard receiving layer suitable for inkjet printing. A method of manufacturing the composition and a recording sheet for inkjet printing having a receiving layer formed from the composition are also provided.

20 Claims, No Drawings

COMPOSITION FOR FORMING RECEIVING LAYER AND RECORDING SHEET FOR INKJET PRINTING

This application is a continuation-in-part application of U.S. Ser. No. 10/108,468, filed Mar. 29, 2002, abandoned.

BACKGROUND OF THE INVENTION

1. Field of the Invention

The present invention relates to a recording sheet for inkjet printing comprising a sheet substrate and a receiving layer formed thereon (hereinafter referred to as "inkjet recording sheet") and a composition suitable for forming the receiving layer.

2. Description of the Background Art

Conventionally, an inkjet recording sheet comprising a sheet substrate and a coated film (hereinafter referred to as "receiving layer") formed by applying a coating material comprising synthetic silica and an aqueous or water-absorbent resin to the sheet substrate has been known. To ensure superior printing performance using this type of inkjet recording sheet, the receiving layer must have a large ink absorption capacity and must be hard. To increase the amount of ink absorbed by the receiving layer, increasing the amount of silica in the coating material for forming the receiving layer usually is effective.

However, if the amount of conventional water-containing synthetic silica manufactured by a precipitation method in the receiving layer is increased, the hardness of the receiving layer may decrease, giving rise to problems such as powder falling.

In addition, it has been difficult to obtain a low viscosity coating material containing a large amount of silica. If silica is dispersed in an aqueous coating material at a high concentration, a large amount of silanol groups which are present on the surface of silica form hydrogen bonds with water, resulting in an increase of viscosity due to exhibition of thixotropy.

One possible way of increasing the hardness of the receiving layer is to reduce the amount of coating material applied to the receiving layer. Reducing the amount of coating material, however, decreases the thickness of the receiving layer, which results in a decrease in the amount of ink absorbed. Another possible way of forming a hard receiving layer capable of absorbing a large amount of ink is alteration of the binder resin composition. However, simply altering the binder resin composition cannot provide a receiving layer with sufficient performance.

The present invention has been achieved in view of the above problems. An object of the present invention is to provide a composition for forming a receiving layer for inkjet printing having a low viscosity, exhibiting excellent applicability, capable of adsorbing a large amount of ink, and forming a hard receiving layer, as well as an inkjet recording sheet having a receiving layer formed from the composition.

SUMMARY OF THE INVENTION

The above object can be achieved in the present invention by a composition for forming a receiving layer, which is a solution or dispersion of a binder resin and a water-containing synthetic silica in a solvent containing 10-80% by weight of alcohol, the water-containing synthetic silica (i) being obtained by a wet gelling method, (ii) having a BET specific surface area of 400-500 m$^2$/g, (iii) having a pore volume determined by a nitrogen adsorption method of 1.1-1.3 ml/g, (iv) having a secondary average particle diameter of 3.5-9.3 µm, and (v) having a residual micropore volume of 70% or more.

In a preferred embodiment of the above composition, the alcohol has a boiling point of 130° C. or less at atmospheric pressure.

The above object can further be achieved in the present invention by a recording sheet for inkjet printing comprising a sheet substrate and a receiving layer formed from the above composition for forming a receiving layer on the base sheet substrate.

The composition for forming a receiving layer of the present invention has a low viscosity, excels in applicability, can absorb a large amount of ink, and can form a hard receiving layer. The recording sheet for ink jet printing of the present invention has a receiving layer which can adsorb a large amount of ink and has a hard receiving layer.

Other objects, features and advantages of the invention will hereinafter become more readily apparent from the following description.

DETAILED DESCRIPTION OF THE INVENTION AND PREFERRED EMBODIMENTS

The composition for forming a receiving layer of the present invention is prepared by dissolving or dispersing a binder resin and a water-containing synthetic silica obtained by a wet gelling method in a solution containing 10-80% by weight of alcohol.

The alcohol preferably has a boiling point of 130° C. or less at atmospheric pressure. If the alcohol having a boiling point of 130° C. or less is used, a coating layer can be easily dried in a short period of time, providing an advantage of operational efficiency.

Methyl alcohol, ethyl alcohol, n-propyl alcohol, isopropyl alcohol, n-butyl alcohol, sec-butyl alcohol, and t-butyl alcohol can be given as specific examples of alcohol which can be used.

The amount of alcohol used in the solvent of the composition of the present invention is preferably 10-80% by weight. The use of a solvent with an alcohol content of 10-80% by weight ensures production of a homogeneously dissolved or dispersed binder resin liquid. In addition, such a solvent can homogeneously disperse water-containing silica obtained by the wet gelling method and produce a low viscosity composition for forming a receiving layer.

As examples of solvents other than alcohols, aromatic hydrocarbons such as benzene, toluene, and xylene; esters such as methyl acetate, ethyl acetate, propyl acetate, and methyl propionate; ketones such as acetone, methyl ethyl ketone, methyl isobutyl ketone, and cyclohexanone; ethers such as diethyl ether, diisopropyl ether, 1,2-dimethoxyethane, tetrahydrofuran, and dioxane; aliphatic hydrocarbon solvents such as pentane, hexane, heptane, cyclopentane, and cyclohexane; and the like can be given. These solvents may be used either individually or in combination of two or more.

The alcohol and the above solvents preferably do not contain a substantial amount of water. The use of the solvent containing an alcohol can produce a coating material with a low viscosity notwithstanding a high solid content of the composition for forming a receiving layer in the range of 20-50% by weight.

The polymer soluble in the solvent containing an alcohol (hereinafter referred to as "a binder resin") includes, but is not limited to, acrylic resin, urethane resin, polyester resin, and polyolefin resin.

As examples of acrylic resin, homopolymers and copolymers containing (meth)acrylic acid ester such as polymethyl (meth)acrylate, polyethyl (meth)acrylate, polypropyl (meth)acrylate, polybutyl (meth)acrylate, methyl (meth)acrylate•butyl (meth)acrylate copolymer, ethyl (meth)acrylate•butyl (meth)acrylate copolymer, ethylene•methyl (meth)acrylate copolymer, and styrene•methyl (meth)acrylate copolymer can be given. Here, (meth)acryl means acryl or methacryl.

A urethane resin is a polyurethane which includes a polyol (a polyhydric alcohol) as a major component and an isocyanate as a cross-linking agent (curing agent). As examples of polyol, compounds having two or more hydroxyl groups in the molecule such as polyethylene glycol, polypropylene glycol, acrylic polyol, polyester polyol, and polyether polyol can be given. As an isocyanate, a polyisocyanate having two or more isocyanate groups in the molecule can be used. Examples are aromatic isocyanates such as 2,4-tolylene diisocyanate, xylene diisocyanate, and 4,4'-diphenylmethane diisocyanate and aliphatic isocyanates such as hexamethylene diisocyanate, isophorone diisocyanate, hydrogenated tolylene diisocyanate, and hydrogenated diphenylmethane diisocyanate.

A polyester resin is a copolymer obtained as an ester from an aromatic dicarboxylic acid such as terephthalic acid, isophthalic acid, or naphthalene dicarboxylic acid as an acid component and an aliphatic diol such as ethylene glycol, diethylene glycol, butanediol, or hexanediol as an alcohol component. Polyethylene terephthalate, polybuthylene terephthalate, polyethylene naphthalate, and ethylene•terephthalate•isophthalate copolymer can be given as examples of polyester resin.

As an olefin resin, a homopolymer of an a-olefin or a copolymer of an a-olefin and other polymerizable monomers such as polyethylene, polypropylene, ethylene•propylene copolymer, ethylene•butene-1 copolymer, propylene•butene-1 copolymer, polybutene-1, butene-1•propylene•ethylene ternary copolymer, polymethylpentene, ethylene•vinyl acetate copolymer, and ethylene•vinyl alcohol copolymer can be given.

The weight average molecular weight of the binder resin is usually 100,000-1,000,000, and preferably 200,000-800,000.

A resin other than these binder resins can be incorporated into the composition for forming a receiving layer of the present invention. Such other resins which can be incorporated include, but are not limited to, polyolefin resins such as polyethylene, polypropylene, polymethylpentene, ethylene•propylene copolymer, and ethylene•vinyl acetate copolymer; conjugated diene resins such as butadiene and butadiene•styrene copolymer; polyvinylidene chloride; polyurethane resin; polyamide resins such as polyamide, polyamide imide, polyether imide, and polyimide; polyester resins such as polyethylene terephthalate, polybuthylene terephthalate, and polyethylene naphthalate; polycarbonate resins; polyether resins such as polyether imide, polyether ketone, polyether sulfone, and polyether nitrile; fluorine polymers such as polytetrafluoroethylene, tetrafluoro ethylene•perfluoroalkoxy vinyl ether copolymer, ethylene•tetrafluoro ethylene copolymer, polyvinylidene fluoride, polyvinyl fluoride, polychlorotrifluoroethylene, and ethylene•chlorotrifluoroethylene copolymer; and the like.

The amount of these other resins is 0-100 parts by weight, and preferably 0-50 parts by weight for 100 parts by weight of the binder resin.

The composition for forming a receiving layer is characterized by comprising a specific amount of a water-containing synthetic silica which (i) is obtained by a wet gelling method, (ii) has a BET specific surface area of 400-500 m²/g, (iii) has a pore volume determined by a nitrogen adsorption method of 1.1-1.3 ml/g, (iv) has a secondary average particle diameter of 3.5-9.3 μm, and (v) has a residual micropore volume of 70% or more. The water-containing synthetic silica prepared by a wet gelling method is added to increase the hardness of the receiving layer.

The composition for forming a receiving layer of the present invention comprises a water-containing synthetic silica which is prepared by a wet gelling method. As a method of manufacturing water-containing synthetic silica, a wet gelling method and wet precipitation method are known. In the wet gelling method, the following reaction is carried out under acidic conditions to obtain silica sol, which is then converted into silica gel to obtain water-containing synthetic silica.

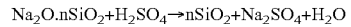
$Na_2O \cdot nSiO_2 + H_2SO_4 \rightarrow nSiO_2 + Na_2SO_4 + H_2O$

In the wet precipitation method, the water-containing synthetic silica is produced by carrying out this reaction under alkaline conditions to cause silica which can be easily filtered to precipitate.

The water-containing synthetic silica obtained by the wet gelling method usually has a primary particle diameter of 3-20 nm and a BET specific surface area (a specific surface area determined by the BET method) of 250-1,000 m²/g. The water-containing synthetic silica obtained by the precipitation method usually has a primary particle diameter of 5-100 nm and a BET specific surface area of 30-300 m²/g. The water-containing synthetic silica obtained by the wet gelling method tends to possess a primary particle diameter smaller and a BET specific surface area larger than the water-containing synthetic silica obtained by the precipitation method. Primary particles of water-containing synthetic silica obtained by the wet gelling method are more flocculative than those obtained by the precipitation method. Secondary particles resulting from flocculation of the primary particles of water-containing synthetic silica obtained by the wet gelling method are harder than those obtained by the precipitation method.

Among water-containing synthetic silicas obtained by a wet gelling method, a water-containing synthetic silica having a BET specific surface area (the specific surface area determined by the BET method) of 400-500 m²/g, a pore volume determined by a nitrogen adsorption method of 1.1-1.3 ml/g, a secondary average particle diameter of 3.5-9.3 μm, and a residual micropore volume of 70% or more is preferably used.

Since a water-containing synthetic silica having a BET specific surface area of less than 400 m²/g has a large primary particle diameter, its secondary particles exhibit a small flocculative force, which results in insufficient hardness of the receiving layer. If the BET specific surface area is more than 500 m²/g, ink absorbency is inadequate due to a decreased pore volume.

A water-containing synthetic silica having a secondary particle diameter of less than 3.5 μm is undesirable, because the viscosity of the resulting composition for forming a receiving layer unduly increases, resulting in poor coatability. On the other hand, if the secondary particle diameter exceeds 9.3 μm, the storage stability of the resulting composition for forming a receiving layer is decreased due to the tendency of the composition to easily precipitate, although the composition has a low viscosity.

The secondary particle diameter of the water-containing synthetic silica used in the present invention can be measured, for example, by the Coulter counter method.

If the pore volume determined by a nitrogen adsorption method is less than 1.1 ml/g, the resulting composition for forming a receiving layer has insufficient ink absorbency. If the pore volume is more than 1.3 ml/g, the secondary particles have a small flocculative force, resulting in insufficient hardness.

The water-containing synthetic silica used in the present invention has a residual rate of micropore volume determined by the nitrogen adsorption method of 70% or more, and more preferably 75% or more. If the residual rate is less than 70%, the hardness of the receiving layer is insufficient, giving rise to a problem such as powder falling and the like.

The pore volume can be measured using the nitrogen adsorption method. The residual rate of micropore volume can be determined by measuring the micropore volume (A) before applying a pressure by the nitrogen adsorption method, applying a pressure of 9.8 MPa to measure the micropore volume (B) at this pressure by the nitrogen adsorption method, and calculating the residual rate (%) by applying the values A and B to the formula (B/A)×100.

The amount of water-containing synthetic silica produced by the wet method used in the composition for forming a receiving layer is usually 10-70% by weight, and preferably 30-60% by weight, in terms of solid components. If the amount of water-containing synthetic silica is less than 10% by weight, the effect of adding this component is insufficient; if more than 70% by weight, it is difficult to form a coating film so that coating strength after formation of a receiving layer may be insufficient.

Other additives such as fillers, dyes, pigments, stabilizers, UV absorbers, fungicides, surfactants, and leveling agents may be added to the composition for forming a receiving layer of the present invention, as required.

The viscosity of the composition for forming a receiving layer of the present invention is usually 1,000-2,000 MPa·s, and preferably 1,000-1,600 MPa·s.

The composition for forming a receiving layer of the present invention can be prepared by adding a water-containing synthetic silica obtained by a wet gelling method and any other optional resins and additives to a binder resin liquid soluble in a solvent containing an alcohol, and homogeneously mixing these components by a conventional mixer or stirring apparatus. The composition for forming a receiving layer thus obtained has a low viscosity and exhibits excellent coatability even if it contains water-containing silica at a high concentration.

The recording sheet for inkjet printing of the present invention can be obtained by applying the above composition for forming a receiving layer to a sheet substrate and drying the receiving layer.

There are no specific limitations to the size and material of the sheet substrate inasmuch as the substrate is in the form of a sheet or a film. A synthetic resin, metal, and ceramics can be given as examples of the materials for the sheet substrate. A paper substrate with a synthetic resin coated over the surface and a sheet substrate with a covering layer provided over the surface to conceal the ground color of the substrate can also be used. Among these, a film or sheet made of a synthetic resin is suitable.

Such a synthetic resin film or sheet includes those made of polyethylene, polypropylene, polyvinyl chloride, polyvinylidene chloride, ethylene·vinyl acetate copolymer, ethylene·vinyl alcohol copolymer, polyethylene terephthalate, polybuthylene terephthalate, polyethylene naphthalate, poly(methyl methacrylate), poly(methyl acrylate), poly(ethyl methacrylate), polystyrene, cellulose triacetate, cellophane, polycarbonate, or the like. Although there are no specific limitations to the thickness of the sheet substrate, the thickness is usually from about 5 to 500 μm.

Conventionally known methods can be used for applying the composition for forming a receiving layer to a substrate without any specific limitations. Such a method includes a roll coating method, curtain flow coating method, Meyerbar coating method, reverse coating method, photogravure coating method, photogravure reverse coating method, air knife coating method, kiss coating method, blade coating method, smooth coating method, and roll knife coating method.

After applying the composition for forming a receiving layer onto the surface of the sheet substrate, the solvent is removed and the coating is dried. There are no specific limitations to the method of solvent removal and drying. Any method including, for example, a method of just leaving the product to stand still at room temperature, a method of heating at 50-200° C., and a method of injecting dry air at a temperature from room temperature to 200° C. to the coated surface can be used. The receiving layer thus produced has a thickness usually in the range of 5-200 μm, preferably 10-100 μm, and more preferably 20-50 μm.

The present invention will be described in more detail by way of examples and comparative examples. The present invention is not limited to the examples described below. The type and amount of polymerizable monomers, the composition and amount of the solvent, the amount of water-containing synthetic silica, and the type of substrates may be freely altered inasmuch as such an alteration does not depart from the spirit and scope of the present invention.

EXAMPLES

The BET specific surface area, secondary average particle diameter, pore volume, and residual micropore volume of the silica used in Examples and Comparative Examples were measured by the following methods.

(1) Measurement of BET Specific Surface Area

The BET specific surface area was measured using a micropore volume meter ("ASAP2400" manufactured by Shimazu Corp.) by the nitrogen adsorption method.

(2) Measurement of Secondary Particle Average Diameter

The secondary particle average diameter was measured by the Coulter counter method at an aperture of 50 μm.

(3) Measurement of Pore Volume

The pore volume was determined using a micropore volume meter ("ASAP2400" manufactured by Shimazu Corp.) by the nitrogen adsorption method.

(4) Measurement of Residual Micropore Volume

The micropore volume (A) of silica before application of pressure was first determined using the above instrument. Next, pressure of 9.8 MPa was applied to silica for 10 minutes using a tabletting machine (handpress "SSP-10", vacuum pump "SA18", manufactured by Shimazu Corp.). Then, the micropore volume (B) of silica after the pressure application was determined using the above instrument. The residual micropore volume (%) was determined by applying (A) and (B) to the formula (B/A)×100.

1) Preparation of Composition for Forming a Receiving Layer

Example 1

60 parts by weight to toluene was added to 100 parts by weight of Resin A, which is an acryl resin solution in a solvent containing an alcohol, consisting of 33.3 wt % of acrylic resin, 26.7 wt % of toluene, and 40.0 wt % of methanol ("Nissetu KP-301" manufactured by Nippon Carbide Industries Co., Inc.). 29 parts by weight of Silica A, which is water-containing synthetic silica obtained by the wet gelling method ("MIZUKASEAL P-78A" (residual rate of micropore volume at 9.8 MPa: 75%), manufactured by Mizusawa Industrial Chemicals, Ltd.) was added to the mixture. The resulting mixture was sufficiently agitated to obtain the composition for forming a receiving layer of Example 1.

Comparative Example 1

The composition for forming a receiving layer of Comparative Example 1 was obtained in the same manner as in Example 1, except for using Silica B, which is water-containing synthetic silica obtained by the wet precipitation method ("FINESEAL X-37B" (residual rate of micropore volume at 9.8 MPa: 61%), manufactured by Tokuyama Corp.) instead of Silica A.

Comparative Example 2

The composition for forming a receiving layer of Comparative Example 2 was obtained by adding a dispersion of 50 parts by weight of Silica A in 168 parts by weight of water to 100 parts by weight of Resin B, which is an ethylene-vinyl acetate resin emulsion consisting of 55 parts by weight of ethylene-vinyl acetate resin and 45 parts by weight of water ("Polysol P-550", manufactured by Showa Highpolymer Co., Ltd.), and agitating the mixture.

The amount of binder resin solid component, amount of solvent, amount of silica, solid component concentration, and viscosity of the composition for a receiving layer of Example 1 and Comparative Examples 1 and 2, are shown in Table 1. The viscosity of the composition was measured using a Brookfield-type viscometer ("BM-type", manufactured by Tokimec Inc.).

TABLE 1

|  | Example 1 | Comparative Example 1 | Comparative Example 2 |
| --- | --- | --- | --- |
| Binder resin | Resin A | Resin A | Resin B |
| Solid components | 33.3 pbw | 33.3 pbw | 55 pbw |
| Solvent | Toluene/methanol 86.7 pbw/40.0 pbw (68.4 wt %/31.6 wt %) | Toluene/methanol 86.7 pbw/40.0 pbw (68.4 wt %/31.6 wt %) | Water 245 pbw (100 wt %) |
| Water-containing synthetic silica | Silica A 29 pbw | Silica B 29 pbw | Silica A 50 pbw |
| Solid component concentration | 33 wt % | 33 wt % | 30 wt % |
| Viscosity | 1,800 MPa · s | 2,000 MPa · s | 11,000 MPa · s | pbw: Parts by weight
wt %: Weight percent

As can be seen from Table 1, the compositions for forming a receiving layer of Example 1 and Comparative Example 1 have a comparatively low viscosity of about 2,000 MPa.s notwithstanding the high concentration of solid components of 33% by 10 weight. In contrast, the composition of Comparative Example 2 has a high viscosity of 1,500 MPa.s in spite of the concentration of water-containing synthetic silica lower than the compositions of Example 1 and Comparative Example 1.

2) Preparation of Recording Sheet

Example 2 and Comparative Examples 3-4

Recording sheets with a receiving layer formed on a polyethylene terephthalate film were prepared by applying the compositions for forming a receiving layer of Example 1 and Comparative Examples 1-2 to the surface of a PET film ("Melinex 339", 75 μm, manufactured by E. I. du Pont de Nemours and Company) to a thickness of 65 μm (Example 1 and Comparative Example 1) or 30 μm (Comparative Example 2, a coating with a thickness of 65 μm could not be produced using the composition of the Comparative Example 2), and drying the coating by a hot air at 100° C. for 90 seconds.

Recording sheets prepared from the compositions for forming a receiving layer of Example 1, Comparative Example 1, and Comparative Example 2 are respectively designated as the recording sheets of Example 2, Comparative Example 3, and Comparative Example 4.

3) Evaluation Tests of Receiving Layer (1) Cellophane Adhesive Tape Peeling Test A 25 mm×100 mm cellophane adhesive tape was applied to the surface of the receiving layer of the recording sheets of Example 2, Comparative Example 3, and Comparative Example 4. The cellophane adhesive tape was then peeled from the surface by pulling the tape in a direction of 90° or more from the horizontal plane of the receiving layer. A recording sheet with no receiving layer material(silica) attached to the peeled cellophane adhesive tape was indicated as "O", the recording sheet with receiving material (silica) attached a little to the tape was indicated as "Δ", and the recording sheet with receiving layer material(silica) attached to the tape was indicates as "X".

(2) Rubbing Test in Conformity to JIS L-0894

The surface of receiving layer of the recording sheets of Example 2 and Comparative Examples 3-4 was rubbed by reciprocating cotton type 3 100 times at a load of 25 g/m² using a Rubbing tester type 2. After rubbing, the surface of receiving layer was observed by the naked eye. The recording sheet with no scratches on the surface of the receiving layer was indicated as "O", the recording sheet with no scratches on the surface of the receiving layer, but receiving layer material(silica) attached a little to the cotton type 3 was indicated as "Δ", and the recording sheet with scratches on the surface of the receiving layer was indicated as "X".

(3) Ink Adsorption Test

The amount of ink solvent adsorbed in the unit area of the receiving layer of the recording sheets of Example 2 and Comparative Examples 3-4 per unit time period was determined. The cup water adsorption method according to JIS P-8140 was followed for the determination, except that EXXOL D130 (manufactured by Exxon), imitating an ink solvent, was used instead of water.

The results of the cellophane adhesive tape peeling test, Rubbing test in conformity to JIS L-0894, and ink adsorption test are summarized in Table 2.

TABLE 2

|  | Example 2 | Comparative Example 3 | Comparative Example 4 |
|---|---|---|---|
| Cellophane adhesive tape peeling test | O | X | O |
| Rubbing test in conformity to JIS L-0894 | O | X | O |
| Ink absorption (g/m$^2$) | 35 | 37 | 17 |

As can be seen from Table 2, the receiving layers of the recording sheets of Example 2 and Comparative Example 4, which contain water-containing synthetic silica obtained by the wet gelling method, exhibited excellent hardness, whereas the hardness of the receiving layer of the recording sheet of Comparative Example 3, which contains water-containing synthetic silica obtained by the wet precipitation method, was insufficient. The receiving layers of recording sheets of Example 2 and Comparative Example 3, in which a methanol-toluene solvent was used, exhibited a large ink-adsorption capacity. In contrast, the ink-adsorption capacity of the receiving layer of recording sheet of Comparative Example 4, in which water was used as solvent, was less than the recording sheets of Example 2 and Comparative Example 3.

Example 3-5 and Comparative Example 5-13

Compositions for forming receiving layer of the following formulation were prepared using the water-containing silicas A-L shown below.

| Formulation Example 1 | |
|---|---|
| Acrylic resin solution *1 | 100 parts by weight |
| Water-containing silica | 29 parts by weight |
| Toluene | 60 parts by weight |

When the secondary particle average diameter of the water-containing synthetic silica was 3 μm or less, the composition for forming receiving layer was prepared according to the following formulation.

| Formulation Example 2 | |
|---|---|
| Acrylic resin solution *1 | 100 parts by weight |
| Water-containing silica | 20 parts by weight |
| Toluene | 34 parts by weight |

*1 Acrylic resin solution consisting of 33.3 wt % of acrylic resin, 26.7 wt % of toluene, and 40.0 wt % of methanol (Trademark: Nissetu KP-301, manufactured by Nippon Carbide Industries Co., Ltd.)

The following water-containing synthetic silicas were used.

A: Water-containing synthetic silica (Trademark: Nipgel BY600, manufactured by Tosoh-Silica Co., Ltd.)
B: Water-containing synthetic silica (Trademark: Carplex BS-304, manufactured by Shionogi& Co., Ltd.)
C: Water-containing synthetic silica (Trademark: Carplex BS-304, manufactured by Shionogi& Co., Ltd.)
D: Water-containing synthetic silica (Trademark: Carplex BS-304, manufactured by Shionogi& Co., Ltd.)
E: Water-containing synthetic silica (Trademark: Mizucaseal P740, manufactured by Mizusawa Industrial Chemicals, Ltd.)
F: Water-containing synthetic silica (Trademark: Mizucaseal P78A, manufactured by Mizusawa Industrial Chemicals, Ltd.)
G: Water-containing synthetic silica (Trademark: Gasi 123, manufactured by Crosfield Co.)
H: Water-containing synthetic silica (Trademark: Syloid 266, W.R.Grace & Company)
I: Water-containing synthetic silica (Trademark: Syloid 620, W.R.Grace & Company)
J: Water-containing synthetic silica (Trademark: Syloid 74, W.R.Grace & Company)
K: Water-containing synthetic silica (Trademark: Silycia 550, manufactured by Fuji Silycia Chemical Ltd.)
L: Water-containing synthetic silica (Trademark: Fineseal X37B, manufactured by Tokuyama Corp.)

In Table 3, A and B in the line entitled "Manufacturing method of water-containing synthetic silica" respectively indicate the wet gel method and the precipitation method.

The following tests were carried out using the compositions for forming receiving layer obtained in Examples 3-5 and the Comparative Examples 5-13.

(1) Measurement of Viscosity

The viscosity of the compositions or forming receiving layer (coating liquids) was measured using a viscometer ("BM-type", manufactured by Tokimec Inc.). The results are shown in Table 3.

(2) Test for Confirming Precipitation Property

The compositions or forming receiving layer (coating liquids) were allowed to stand for 72 hours at room temperature to inspect the presence or absence of silica precipitation by naked eye observation. The compositions with silica no precipitation were indicated as "O" and the compositions with silica precipitation were indicated as "X". The evaluation results are shown in Table 3.

(3) Cellophane Adhesive-Tape Peeling Test, Rubbing Test in Conformity to JIS L-0894, and Ink Solvent Adsorption Test In the same manner as in Example 2, recording films were prepared by forming receiving layers on polyethylene terephthalate films using the compositions for forming receiving layer obtained in Examples 3-5 and Comparative Examples 5-13. The same cellophane adhesive-tape peeling test, Rubbing test in conformity to JIS L-0894, and ink solvent adsorption test as carried out on the receiving layers of the recording sheets of Example 2 and Comparative Examples 3-4 were carried out using the resulting receiving layers. The results are shown in Table 3.

TABLE 3

|  | Example | | | Comparative Example | | | | | | | | |
|---|---|---|---|---|---|---|---|---|---|---|---|---|
|  | 3 | 4 | 5 | 5 | 6 | 7 | 8 | 9 | 10 | 11 | 12 | 13 |
| Water-containing synthetic silica | A | B | C | D | E | F | G | H | I | J | K | L |

TABLE 3-continued

|  | Example | | | Comparative Example | | | | | | | | |
| --- | --- | --- | --- | --- | --- | --- | --- | --- | --- | --- | --- | --- |
|  | 3 | 4 | 5 | 5 | 6 | 7 | 8 | 9 | 10 | 11 | 12 | 13 |
| Method of preparing Water-containing synthetic silica | A | A | A | A | A | A | A | A | A | A | A | B |
| Secondary particle average diameter (μm) | 3.8 | 9.3 | 3.5 | 14.7 | 2.2 | 3.3 | 2.5 | 2.0 | 15.0 | 8.0 | 2.7 | 3.7 |
| BET specific surface area (m$^2$/g) | 450 | 420 | 420 | 420 | 400 | 360 | 300 | 310 | 320 | 350 | 500 | 300 |
| Pore volume (ml/g) | 1.3 | 1.1 | 1.1 | 1.1 | 1.7 | 1.6 | — | 1.6 | 1.1 | 1.1 | 0.8 | — |
| Residual micropore volume (%) | 80 | 87 | 87 | 87 | 85 | 75 | 60 | 61 | 92 | 89 | 95 | 61 |
| Viscosity (MPa · s) | 1500 | 1030 | 1600 | 700 | 3700 | 1800 | 3200 | 5000 | 680 | 1200 | 2800 | 2000 |
| Test for confirming precipitation | O | O | O | X | O | O | X | O | X | O | O | O |
| Cellophane adhesive tape peeling test | O | O | O | O | O | Δ | X | X | Δ | Δ | O | X |
| Rubbing test in conformity to JIS L-0894 | O | O | O | O | O | Δ | X | X | Δ | Δ | O | X |
| Ink absorption (g/m$^2$) | 36 | 34 | 32 | 29 | 35 | 35 | 33 | 32 | 22 | 22 | 19 | 37 |

It can be seen from Table 3 that the compositions for forming receiving layer of Examples 3-5 are excellent in storage stability with no precipitation after having been allowed to stand for a long time (72 hours). On the other hand, the compositions for forming receiving layer of Comparative Examples 5 and 10 using silica with a large secondary average particle size produced precipitate, indicating poor storage stability. The recording layers formed from the compositions for forming receiving layer of Examples 3-5 showed excellent peeling resistance, abrasion resistance, and ink solvent absorption properties.

On the other hand, the recording layers formed from the compositions for forming receiving layer of Comparative Examples 7, 8, 9, 10, 11, and 13, in which silica with a BET specific surface area of less than 400 m$^2$/g was used, exhibited poor peeling resistance and abrasion resistance. The recording layer formed from the composition for forming receiving layer of Comparative Example 12 having a BET specific surface area of 500 m$^2$/g absorbed only a small amount of ink (19 g /m$^2$).

Although not clear from Table 3, the composition for forming receiving layer of Comparative Example 6 with a small secondary average particle diameter of 2.2 μm and a large pore volume of 1.7 ml/g had a larger viscosity of 3,700 MPa.s and exhibited poor coatability.

As described above, a composition for forming a receiving layer having a low viscosity, exhibiting excellent applicability, capable of adsorbing a large amount of ink, and forming a hard layer permitting only a slight amount of powder falling, a method of manufacturing the composition, an inkjet recording sheet having a receiving layer formed from the composition, and a method of manufacturing the inkjet recording sheet are provided by the present invention.

Because the inkjet recording sheet of the present invention form a hard receiving layer which can adsorb a large amount of ink and permits only a slight amount of powder to fall, the recording sheet can be used not only as general-purpose printing paper, but also as a sheet for printing sign boards, posters, wall decorations, and the like. Published Application No. 2002/0193496 is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed is:

1. A composition for forming a receiving layer, which is a solution or dispersion of a binder resin and a water-containing synthetic silica in a solvent containing 10-80% by weight of alcohol, the water-containing synthetic silica (i) being obtained by a wet gelling method, (ii) having a BET specific surface area of 400-500 m$^2$/g, (iii) having a pore volume determined by a nitrogen adsorption method of 1.1-1.3 ml/g, (iv) having a secondary average particle diameter of 3.5-9.3 μm, and (v) having a residual micropore volume of 70% or more, wherein the composition has a viscosity of from 1,000 to 1,600 MPa•s.

2. The composition for forming a receiving layer according to claim 1, wherein the alcohol has a boiling point of 130° C. or less at atmospheric pressure.

3. A recording sheet for inkjet printing comprising a sheet substrate and a receiving layer formed from the composition according to claim 1 on the sheet substrate.

4. A recording sheet for inkjet printing comprising a sheet substrate and a receiving layer formed from the composition according to claim 2 on the sheet substrate.

5. The composition as claimed in claim 1, wherein the binder resin is a solution in the solvent.

6. The composition as claimed in claim 2, wherein the binder resin is a solution in the solvent.

7. The composition as claimed in claim 1, wherein the binder resin is at least one selected from the group consisting of an acrylic resin, a urethane resin, a polyester resin, and a polyolefin resin.

8. The composition as claimed in claim 1, wherein the alcohol is at least one selected from the group consisting of methyl alcohol, ethyl alcohol, n-propyl alcohol, isopropyl alcohol, n-butyl alcohol, sec-butyl alcohol and t-butyl alcohol.

9. The composition as claimed in claim 1, wherein the water containing synthetic silica has a residual pore volume rate of 75% or more determined by nitrogen absorption.

10. The composition of claim 1, wherein the solvent is substantially free of water.

11. The composition of claim 1, wherein the water-containing synthetic silica is present in an amount of 30-60% by weight based upon the total weight of the solid components of the composition.

12. A composition for forming a receiving layer, which is a solution or dispersion of a binder resin and a water-containing synthetic silica in a solvent containing 10-80% by weight of alcohol, the water-containing synthetic silica (i) being obtained by a wet gelling method, (ii) having a BET specific surface area of 400-500 $m^2/g$, (iii) having a pore volume determined by a nitrogen adsorption method of 1.1-1.3 ml/g, (iv) having a secondary average particle diameter of 3.5-9.3 μm, and (v) having a residual micropore volume of 70% or more, wherein the binder resin is an acrylic resin.

13. The composition for forming a receiving layer according to claim 12, wherein the alcohol has a boiling point of 130° C. or less at atmospheric pressure.

14. A recording sheet for inkjet printing comprising a sheet substrate and a receiving layer formed from the composition according to claim 12 on the sheet substrate.

15. A recording sheet for inkjet printing comprising a sheet substrate and a receiving layer formed from the composition according to claim 13 on the sheet substrate.

16. The composition as claimed in claim 12, wherein the binder resin is a solution in the solvent.

17. The composition as claimed in claim 12, wherein the alcohol is at least one selected from the group consisting of methyl alcohol, ethyl alcohol, n-propyl alcohol, isopropyl alcohol, n-butyl alcohol, sec-butyl alcohol and t-butyl alcohol.

18. The composition as claimed in claim 12, wherein the water containing synthetic silica has a residual pore volume rate of 75% or more determined by nitrogen absorption.

19. The composition of claim 12, wherein the solvent is substantially free of water.

20. The composition of claim 12, wherein the water-containing synthetic silica is present in an amount of 30-60% by weight based upon the total weight of the solid components of the composition.

* * * * *